(12) United States Patent
Akcam et al.

(10) Patent No.: US 11,685,216 B2
(45) Date of Patent: Jun. 27, 2023

(54) METHOD FOR CONTROLLING AN AIR SUSPENSION SYSTEM OF A VEHICLE

(71) Applicant: ZF CV SYSTEMS HANNOVER GMBH, Hannover (DE)

(72) Inventors: Halil Akcam, Hannover (DE); Sebastian Jermis, Springe (DE)

(73) Assignee: ZF CV Systems Hannover GmbH, Hannover (DE)

( * ) Notice: Subject to any disclaimer, the term of this patent is extended or adjusted under 35 U.S.C. 154(b) by 101 days.

(21) Appl. No.: 17/503,070

(22) Filed: Oct. 15, 2021

(65) Prior Publication Data

US 2022/0032716 A1 Feb. 3, 2022

Related U.S. Application Data

(63) Continuation of application No. PCT/EP2020/061432, filed on Apr. 24, 2020.

(30) Foreign Application Priority Data

May 10, 2019 (DE) ..................... 10 2019 112 214.7

(51) Int. Cl.
*B60G 17/052* (2006.01)
*B60G 17/015* (2006.01)

(52) U.S. Cl.
CPC ..... *B60G 17/0523* (2013.01); *B60G 17/0155* (2013.01); *B60G 2202/152* (2013.01);
(Continued)

(58) Field of Classification Search
None
See application file for complete search history.

(56) References Cited

U.S. PATENT DOCUMENTS 6,523,845 B2 2/2003 Stiller
7,139,649 B2 11/2006 Heer
(Continued)

FOREIGN PATENT DOCUMENTS

CA 3088369 A1 * 1/2022 .......... B60G 17/052
DE 36 38 849 A1 5/1988
(Continued)

OTHER PUBLICATIONS

International Search Report of the European Patent Office dated Jul. 20, 2020 for international application PCT/EP2020/061432 on which this application is based.
(Continued)

*Primary Examiner* — Faye M Fleming
(74) *Attorney, Agent, or Firm* — Walter Ottesen, P.A.

(57) ABSTRACT

A method for controlling an air suspension system of a vehicle includes: a) determining a bellows pressure-time characteristic curve for air admission to and release from the bellows of one air spring or the bellows of a plurality of air springs, the characteristic curve being normalized with the value of a supply pressure in a reservoir for compressed air, b) sensor measurement of a current pressure in the spring bellows of the air springs as well as the current supply pressure immediately before air admission thereto or air release therefrom, c) determining, from the normalized characteristic curve, the opening duration for the associated shutoff valve using the ratio of the measured bellows pressure to the measured supply pressure and the ratio of the provided target pressure to the measured supply pressure, d) opening the associated shutoff valve for the determined opening duration in order to set the provided target pressure.

7 Claims, 2 Drawing Sheets

(52) U.S. Cl.
   CPC .............. *B60G 2400/51222* (2013.01); *B60G 2400/7122* (2013.01); *B60G 2500/203* (2013.01); *B60G 2500/2021* (2013.01)

(56) References Cited

U.S. PATENT DOCUMENTS

| | | | |
|---|---|---|---|
| 11,034,205 B2 * | 6/2021 | Reuter | B60G 17/018 |
| 11,458,794 B2 * | 10/2022 | Coombs | B60G 17/0152 |
| 2022/0032715 A1 * | 2/2022 | Scherba | B60G 17/0164 |
| 2022/0032717 A1 * | 2/2022 | Akcam | G01M 17/04 |

FOREIGN PATENT DOCUMENTS

| | | | |
|---|---|---|---|
| DE | 39 15 966 A1 | | 11/1989 |
| DE | 195 46 324 A1 | | 6/1997 |
| DE | 10 2004 051 740 A1 | | 9/2006 |
| DE | 102020121637 A1 | * | 2/2022 |
| EP | 0 170 794 A2 | | 2/1986 |
| EP | 1 123 822 A2 | | 8/2001 |
| JP | H0370615 A | | 3/1991 |

OTHER PUBLICATIONS

International Preliminary Report on Patentability dated Nov. 16, 2021 for international application PCT/EP2020/061432 on which this application is based.
Written Opinion of the International Searching Authority dated Jul. 20, 2020 for international application PCT/EP2020/061432 on which this application is based.

* cited by examiner

METHOD FOR CONTROLLING AN AIR SUSPENSION SYSTEM OF A VEHICLE

CROSS REFERENCE TO RELATED APPLICATIONS

This application is a continuation application of international patent application PCT/EP2020/061432, filed Apr. 24, 2020, designating the United States and claiming priority from German application 10 2019 112 214.7, filed May 10, 2019, and the entire content of both applications is incorporated herein by reference.

TECHNICAL FIELD

The disclosure relates to a method for controlling an air suspension system of a vehicle, which system has a changeover valve for each of the air springs of a vehicle axle or of multiple, adjacent tandem axles, and has a shutoff valve for the air spring of each vehicle wheel of the vehicle axle or for each of the air springs on each vehicle side of the tandem axles, and in which the respective changeover valve and the shutoff valves are structurally combined in a valve block arranged remote from the air springs, wherein, for measuring the bellows pressure in each of the spring bellows of the air springs, the air suspension system has a respective pressure sensor, the sensors being arranged in or on the valve block, wherein each of the pressure sensors is connected at the outlet of the associated shutoff valve to the connection line of the spring bellows of the associated air spring or of the spring bellows of the associated air springs, and in which the bellows pressure in the spring bellows of the air springs can be set exactly to a target pressure via the measured values of the pressure sensors.

BACKGROUND

Normally, the air suspension system of a vehicle has a changeover valve, preferably configured as a 3/2-way solenoid switching valve, for each of the air springs of a vehicle axle or of multiple, adjacent tandem axles, and has a shutoff valve, preferably configured as a 2/2-way solenoid switching valve, for the air spring of each vehicle wheel of the vehicle axle or for each of the air springs on each vehicle side of the tandem axles. Via the changeover valve, a working pressure line can be connected alternately to a vent outlet or a pressure-carrying supply line. The two shutoff valves, via which a respective connection line leading to the spring bellows of the associated air spring or to the spring bellows of the associated air springs can be connected alternately to the working pressure line or shut off from the latter, are connected to the working pressure line, for example, via a T pipe.

In the unactuated, that is, deenergized, state of the changeover valve, the working pressure line is connected to the vent outlet and is thus unpressurized. In the actuated, that is, energized, state of the changeover valve, the working pressure line is connected to the supply line and is thus under a supply pressure made available by a compressed air system. In the unactuated, that is, deenergized, state of the shutoff valves, these are in each case closed, and the connection lines are shut off from the working pressure line. To lower the bellows pressure in the spring bellows of the associated air spring or in the spring bellows of the associated air springs, all that is required is to open the relevant shutoff valve, thereby releasing air from the one or more spring bellows in each case. To increase the bellows pressure in the spring bellows of the associated air spring or in the spring bellows of the associated air springs, on the other hand, the switching over of the changeover valve and the opening of the relevant shutoff valve are required, as a result of which air is admitted to the one or more spring bellows in each case.

To determine the height or level of the vehicle body relative to a vehicle axle, a height or level sensor connected via a sensor line to an electronic control unit is arranged on each side of each vehicle axle or, in the case of adjacent tandem axles, at least of one of the tandem axles. To determine the bellows pressures in the spring bellows of the air springs, a pressure sensor connected by a sensor line to the electronic control unit is connected to the connection line of each spring bellows of one vehicle axle or, in the case of tandem axles, of the spring bellows on one vehicle side. Depending on the sensor signals from the height sensors and the pressure sensors and on setpoint data specified by a control program or input manually by a driver, the changeover and shutoff valves are controlled by the electronic control unit via electric control lines in order to maintain or adjust a specified height of the vehicle body by the admission or release of air to or from the spring bellows of the relevant air springs.

The pressure sensors can be connected to the respective connection line at a point directly adjacent to the air springs. This has the advantage that the respective bellows pressure in the spring bellows of the adjacent air spring can be measured largely without distortion, even in the case of dynamic pressure changes. However, the disadvantages with such a decentralized arrangement of the pressure sensors are the required long sensor lines, the increased assembly effort and the exposure of the pressure sensors and their electric plugs to dirt and spray. A decentralized arrangement of the pressure sensors close to the air springs is known from an air suspension system described in DE 36 38 849 A1, for example.

As an alternative, the pressure sensors may also be arranged remote from the air springs in or on the respective valve block and connected at the outlet of the associated shutoff valve to the connection line. The advantages with such a centralized arrangement of the pressure sensors are the required short sensor lines, the lower assembly effort and the largely protected position of the pressure sensors and their electric plugs in respect of dirt and spray. However, this arrangement remote from the air springs has the disadvantage that the respective bellows pressure in the spring bellows of the adjacent air spring is detected in a distorted way by the pressure sensors, especially during the dynamic pressure changes during the opening and closing of the associated shutoff valve. A centralized arrangement of the pressure sensors in an air suspension system control block which, in addition to the control valves, also includes an electronic control unit is known from DE 195 46 324 C2, for example.

SUMMARY

Since accurate control of air admission and release to and from the spring bellows is not possible on the basis of the sensed air pressures, it is an underlying object of the disclosure to provide a method for controlling an air suspension system of a vehicle of the configuration mentioned at the outset via which the bellows pressure in the spring bellows of the air springs can nevertheless be set exactly to a target pressure.

This object can, for example, be achieved by a method for controlling an air suspension system of a vehicle, wherein the system has a changeover valve for air springs of a vehicle axle or of multiple, adjacent tandem axles, and the system further has a shutoff valve for the air spring of each vehicle wheel of the vehicle axle or for each of the air springs on each vehicle side of the multiple, adjacent tandem axles, wherein the respective changeover valve and the shutoff valves are structurally combined in a valve block arranged remote from the air springs, wherein each of the air springs has a spring bellows and, for measuring a bellows pressure in each of the spring bellows of the air springs, the air suspension system has a respective pressure sensor, the sensors being arranged in or on the valve block, wherein each of the pressure sensors is connected at an outlet of the corresponding shutoff valve to a connection line of the spring bellows of the corresponding air spring or of the spring bellows of the associated air springs, and in which the bellows pressure ($p_B$) in the spring bellows of the air springs can be set exactly to a target pressure ($p_{B\_2}$) via measured values of the pressure sensors. The method includes:

a) determining at least one bellows pressure-time characteristic curve ($p_B/p_V$ (t)) for air admission to and air release from the spring bellows of one of the air springs or of the spring bellows of a plurality of air springs, the characteristic curve being normalized with a value of a supply pressure ($p_V$) in a storage reservoir for compressed air;

b) measuring via a sensor a current bellows pressure ($p_{B\_1}$) in the spring bellows of the air spring or in the spring bellows of the air springs as well as a current supply pressure ($p_{V\_1}$) immediately before air admission thereto or air release therefrom;

c) determining, from the normalized bellows pressure-time characteristic curve ($p_B/p_V(t)$) for air admission or release, an opening duration ($\Delta t_o$) for the corresponding shutoff valve using the ratio of the measured bellows pressure ($p_{B\_1}$) to the measured supply pressure ($p_{V\_1}$) and the ratio of the provided target pressure ($p_{B\_2}$) to the measured supply pressure ($p_{V\_1}$); and, d) opening the corresponding shutoff valve for the determined opening duration ($\Delta t_o$) in order to set a provided target pressure ($p_{B\_2}$).

Accordingly, the disclosure relates to a method for controlling an air suspension system of a vehicle, which system has a changeover valve for each of the air springs of a vehicle axle or of multiple, adjacent tandem axles, and has a shutoff valve for the air spring of each vehicle wheel of the vehicle axle or for each of the air springs on each vehicle side of the tandem axles, and in which the respective changeover valve and the shutoff valves are structurally combined in a valve block arranged remote from the air springs, wherein, for measuring the bellows pressure in each of the spring bellows of the air springs, the air suspension system has a respective pressure sensor, the sensors being arranged in or on the valve block, wherein each of the pressure sensors is connected at the outlet of the associated shutoff valve to the connection line of the spring bellows of the associated air spring or of the spring bellows of the associated air springs, and in which the bellows pressure in the spring bellows of the air springs can be set exactly to a target pressure via the measured values of the pressure sensors.

Owing to the arrangement of the pressure sensors remote from the spring bellows of the air springs, particularly also because of the pressure peaks and pressure fluctuations caused by the opening and closing processes of the shutoff valves, the sensed air pressures differ from the bellows pressures present in the spring bellows of the air springs. In order to be able nevertheless to set the provided target pressures relatively exactly in the case of air admission to or air release from spring bellows, an embodiment of the disclosure provides the following method steps:

a) in each case determining at least one bellows pressure-time characteristic curve $p_B/p_V(t)$ for air admission to and air release from the spring bellows of one air spring or of the spring bellows of a plurality of air springs, the characteristic curve being normalized with the value of a supply pressure $p_V$ in a storage reservoir for compressed air, b) sensor measurement of the current bellows pressure $p_{B\_1}$ in the spring bellows of the air spring or in the spring bellows of the air springs as well as the current supply pressure $p_{V\_1}$ immediately before air admission thereto or air release therefrom, c) determining, from the normalized bellows pressure-time characteristic curve $p_B/p_V(t)$ for air admission or release, the opening duration $\Delta t_o$ for the associated shutoff valve using the ratio of the measured bellows pressure $p_{B\_1}$ to the measured supply pressure $p_{V\_1}$ and the ratio of the provided target pressure $p_{B\_2}$ to the measured supply pressure $p_{V\_1}$, d) opening the associated shutoff valve for the determined opening duration $\Delta t_o$ in order to set the provided target pressure $p_{B\_2}$.

The bellows pressure which is measurable via the associated pressure sensor during the opening duration $\Delta t_o$ but is distorted is thus not used in the method according to the disclosure. By virtue of the normalization of the bellows pressures $p_B$ with the supply pressure $p_V$, the influence of differences in the level of the supply pressure $p_V$, due to fluctuations associated with supply and removal, on the bellows pressure-time characteristic curve $p_B/p_V$ (t) and on the respective opening duration $\Delta t_o$ of the associated shutoff valve are eliminated.

The normalized bellows pressure-time characteristic curves $p_B/p_V$ (t) can each preferably be determined using different bellows pressure ratios $p_{B\_1}/p_{V\_1}$ before air admission or release and using different opening durations $\Delta t_o$ of the associated shutoff valve with a respective target pressure ratio $p_{B\_2}/p_{V\_1}$ as the result.

The normalized bellows pressure-time characteristic curves $p_B/p_V$ (t) are determined at the vehicle manufacturers before final inspection of the respective vehicle and are stored in a data memory of an electronic control unit of the vehicle.

Since there can be wear on the control valves and ageing-related changes in the material properties of the spring bellows while the vehicle is being driven, it is worthwhile if the normalized bellows pressure-time characteristic curves $p_B/p_V(t)$ are checked at specified time or mileage intervals during servicing work at a specialist workshop, and are corrected if required.

In principle, the normalized bellows pressure-time characteristic curves $p_B/p_V$ (t) are each determined in accordance with the length of the connection line, the diameter of the connection line, the existing angle in the run of the connection line, and the volume of the one or more connected spring bellows. This makes it possible for the bellows pressure-time characteristic curves $p_B/p_V$ (t) determined to be transferred to combinations of connection lines and spring bellows with the same dimensions, that is, the relatively complex determination of the bellows pressure-time characteristic curves $p_B/p_V$ (t) on vehicles with connection lines of similar configuration and arrangement is avoided.

Since the bellows pressure-time characteristic curves $p_B/p_V$ (t) and the opening durations $\Delta t_o$ determined therefrom can also be influenced by the temperature of the compressed air and the respective opening combination of the changeover valve and the shutoff valves, provision can additionally be made for separate bellows pressure-time characteristic curves $p_B/p_V(t)$ to be determined in each case for certain temperature ranges of the compressed air and/or for different opening combinations of the changeover valve and the shutoff valves.

BRIEF DESCRIPTION OF THE DRAWINGS

The invention will now be described with reference to the drawings wherein.

DESCRIPTION OF THE PREFERRED EMBODIMENTS

Figure 1:
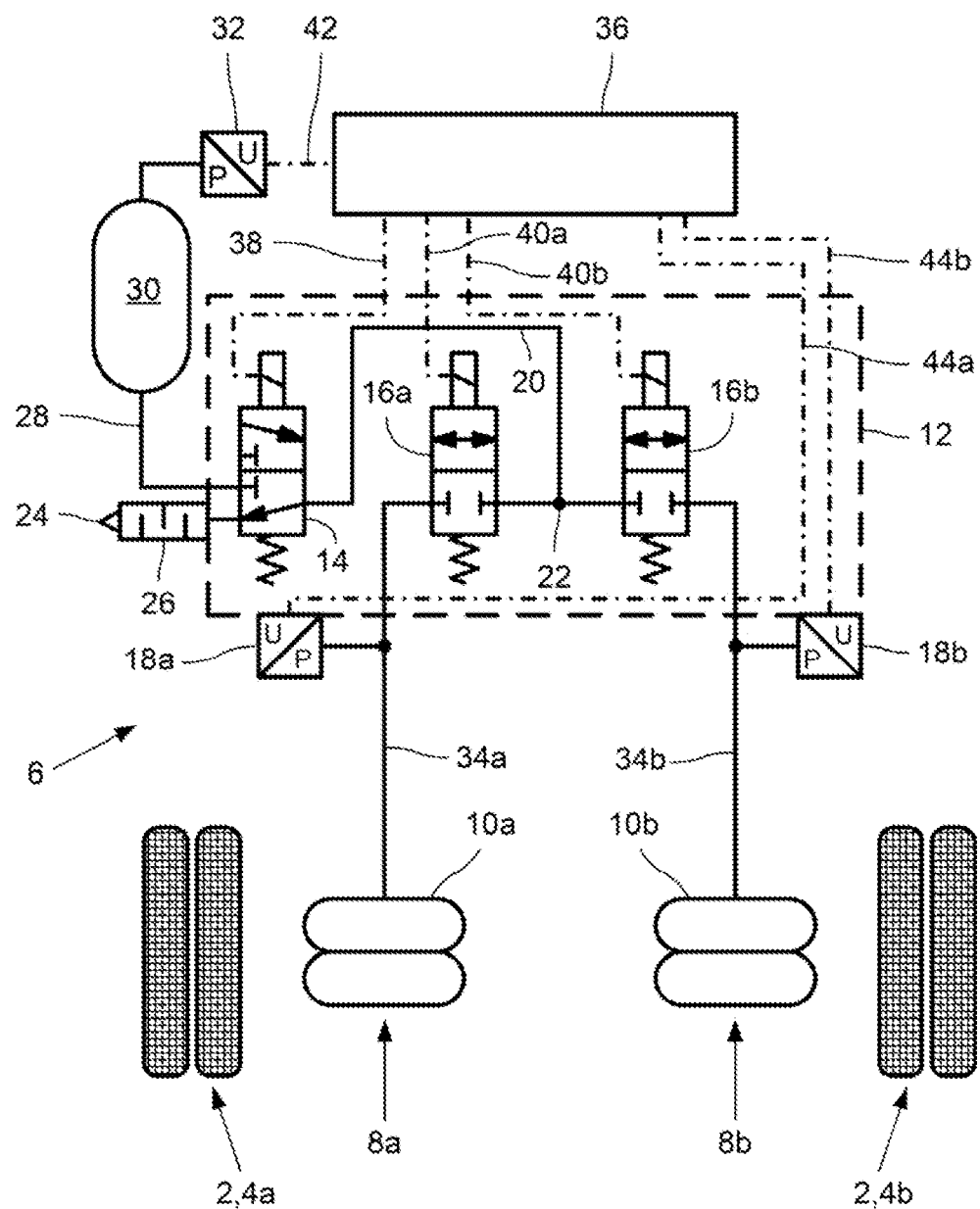
FIG. 1 shows an air suspension system for a vehicle axle of a vehicle having a centralized arrangement of pressure sensors in a schematic view.

An air suspension system 6, depicted schematically in FIG. 1, for a vehicle axle 2 of a vehicle includes an air spring 8a, 8b having a spring bellows 10a, 10b for each vehicle wheel 4a, 4b of the vehicle axle 2, a valve block 12 having a changeover valve 14, configured as a 3/2-way solenoid switching valve, and a shutoff valve 16a, 16b, configured as a 2/2-way solenoid switching valve, for the air spring 8a, 8b of each vehicle wheel 4a 4b, and a pressure sensor 18a, 18b for measuring the bellows pressure in each of the spring bellows 10a, 10b of the air springs 8a, 8b.

Via the changeover valve 14, which is connected by an electric control line 38 to an electronic control unit 36, a working pressure line 20 can be connected alternately to a vent outlet 24 provided with a muffler 26 or to a pressure-carrying supply line 28. A storage reservoir 30 and a pressure sensor 32 are connected to the supply line 28. The pressure sensor 32 measures the supply pressure $p_V$ of the compressed air present in the storage reservoir 30 and is connected by an electric sensor line 42 to the electronic control unit 36. Via the two shutoff valves 16a, 16b, which are connected on the inlet side, via a T piece 22, to the working pressure line 20 and are each connected by an electric control line 40a, 40b to the electronic control unit 36, a respective connection line 34a, 34b leading to the spring bellows 10a, 10b of the associated air spring 8a, 8b can alternately be connected to the working pressure line 20 or shut off from the latter.

In the unactuated, that is, deenergized, state of the changeover valve 14, the working pressure line 20 is connected to the vent outlet 24 and is thus unpressurized. In the actuated, that is, energized, state of the changeover valve 14, the working pressure line 20 is connected to the supply line 28 and is thus under the supply pressure $p_V$ present in the storage reservoir 30.

In the unactuated, that is, deenergized, state of the shutoff valves 16a, 16b, these are in each case closed, and the connection lines 34a, 34b are in this case shut off from the working pressure line 20. To lower the bellows pressure in the spring bellows 10a, 10b of the associated air spring 8a, 8b, all that is required is to open the relevant shutoff valve 16a, 16b, as a result of which air is released from the respective spring bellows 10a, 10b. To increase the bellows pressure in the spring bellows 10a, 10b of the associated air spring 8a, 8b, on the other hand, the switching over of the changeover valve 14 and the opening of the relevant shutoff valve 16a, 16b are required, as a result of which air is admitted to the respective spring bellows 10a, 10b.

The pressure sensors 18a, 18b are arranged in or on the valve block 12 and are each connected at the outlet of the associated shutoff valve 16a, 16b to the connection line 34a, 34b of the spring bellows 10a, 10b of the associated air spring 8a, 8b. The pressure sensors 18a, 18b are configured as pressure-voltage transducers and are each connected to the electronic control unit 36 by a respective electric sensor line 44a, 44b.

Figure 2:
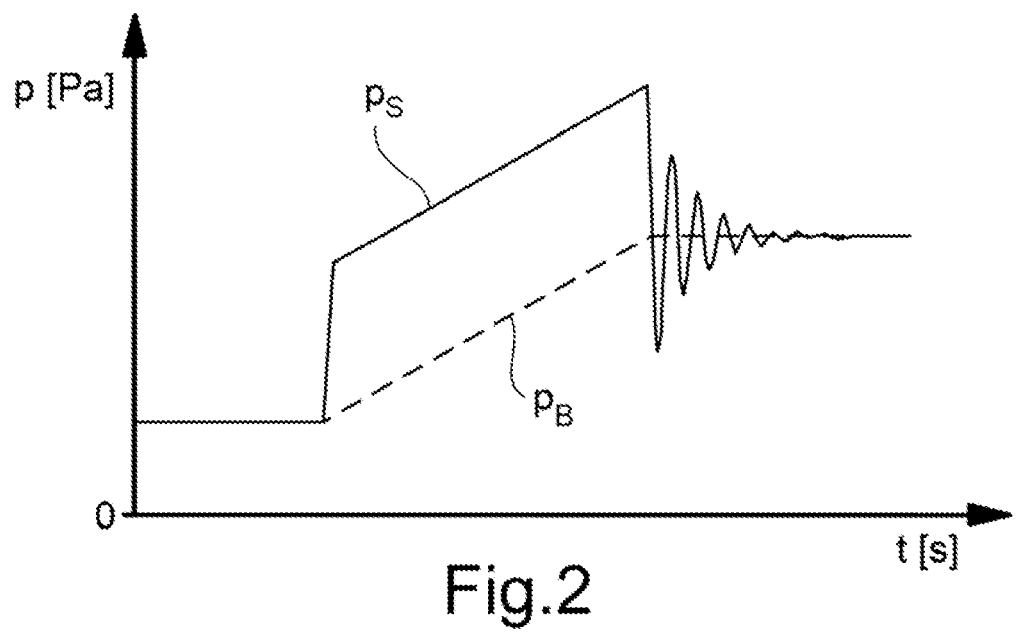
FIG. 2 shows the pressure curves for the bellows pressure of a spring bellows and for the pressure detected by a pressure sensor against time during an air admission process in a diagram; and, FIG. 3 shows the determination of the opening duration of a shutoff valve for the admission of air to a spring bellows via a characteristic curve in a diagram.

As illustrated by way of example in the pressure-time diagram of FIG. 2 for air admission to the spring bellows 10a, 10b of an air spring 8a, 8b, the bellows pressure $p_B$ present in the relevant spring bellows 10a, 10b and the air pressure $p_S$ present at the outlet of the associated shutoff valve 16a, 16b and measured by the associated pressure sensor 18a, 18b deviate to a relatively great extent from one another over the time t during an air admission process since pressure peaks and pressure fluctuations occur at the outlet of the relevant shutoff valve 16a, 16b owing to the opening and closing thereof. Accurate control of air admission and release to and from the spring bellows 10a, 10b on the basis of the sensed air pressures $p_S$ is thus not possible.

Figure 3:
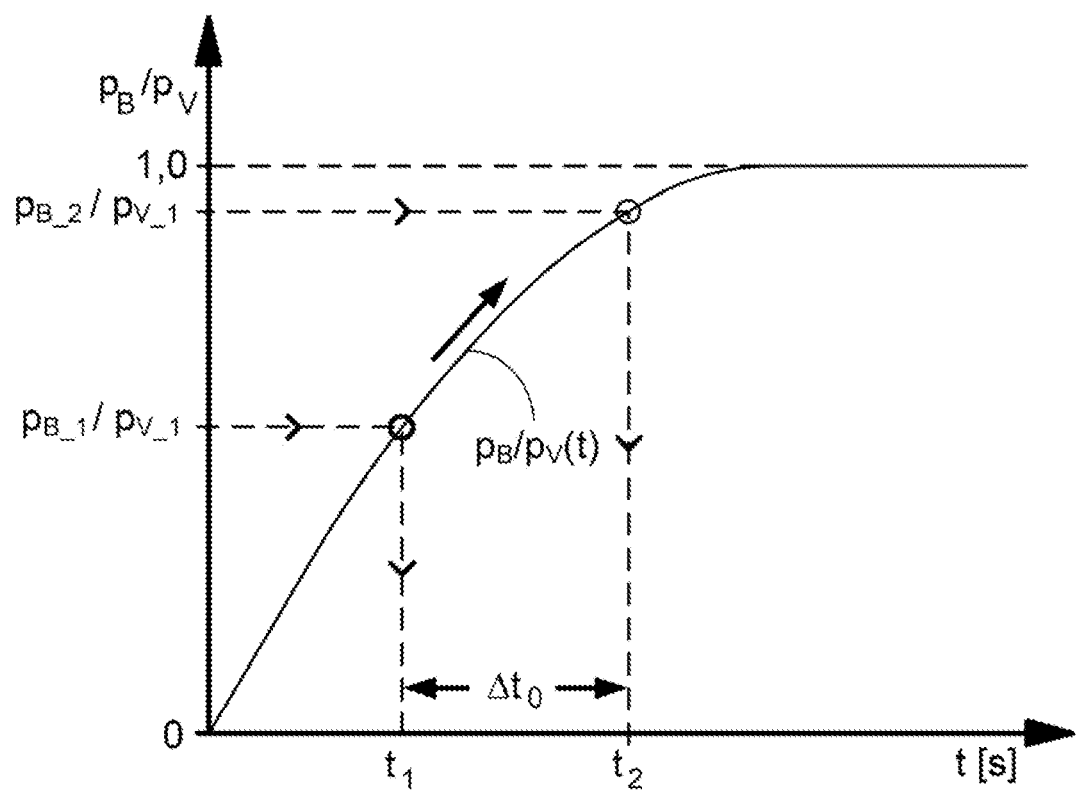

The control method described below, which is illustrated in the diagram in FIG. 3, serves to solve this problem. The method envisages that, immediately before air admission to at least one of the spring bellows 10a, 10b of the air springs 8a, 8b, the current bellows pressure $p_{B\_1}$ in the relevant spring bellows 10a, 10b as well as the current supply pressure $p_{V\_1}$ are measured via the pressure sensors 18a, 18b, and the bellows pressure ratio $p_{B\_1}/p_{V\_1}$ before air admission is formed therefrom. Exact determination of the bellows pressure $p_B$ via the associated pressure sensor 18a, 18b is possible since the bellows pressure $p_B$ before air admission is constant, and thus the sensed air pressure $p_S$ is identical with the bellows pressure $p_B$ present in the spring bellows 10a, 10b.

The target pressure ratio $p_{B\_2}/p_{V\_1}$ is then formed from the provided target pressure $p_{B\_2}$ up to which air is to be admitted to the spring bellows 10a, 10b and the sensed supply pressure $p_{V\_1}$. Using the bellows pressure ratio $p_{B\_1}/p_{V\_1}$ and the target pressure ratio $p_{B\_2}/p_{V\_1}$, the opening duration $\Delta t_o$ between two times $t_1$ and $t_2$, over which the associated shutoff valve 16a, 16b must be opened, after the switching over of the changeover valve 14, in order to increase the bellows pressure $p_B$ in the relevant spring bellows 10a, 10b from the bellows pressure $p_{B\_1}$ before air admission to the target pressure $p_{B\_2}$ after air admission, is then determined from a previously determined bellows pressure-time characteristic curve $p_B/p_V(t)$ normalized with the supply pressure $p_V$.

In the next step, the changeover valve 14 is switched over, and the associated shutoff valve 16a, 16b is opened for the determined opening duration $\Delta t_o$. The setting of the target pressure $p_{B\_2}$ in the relevant spring bellows 10a, 10b is a relatively accurate process because the air pressure $p_S$ that can be measured with the associated pressure sensor 18a, 18b, which deviates from the bellows pressure $p_B$ in the spring bellows 10a, 10b during the air admission process, is not taken into account.

For air admission to and air release from the spring bellows of an air spring, at least one bellows pressure-time characteristic curve $p_B/p_V$ (t) normalized with the supply pressure $p_V$ is determined in each case. The bellows pressure-time characteristic curves $p_B/p_V$ (t) can preferably be determined at the vehicle manufacturers before final inspection of the respective vehicle and are stored in a data memory of an electronic control unit 36.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

2 vehicle axle
4a, 4b vehicle wheels
6 air suspension system
8a, 8b air springs
10a, 10b spring bellows
12 valve block
14 changeover valve
16a, 16b shutoff valves
18a, 18b pressure sensors
20 working pressure line
22 T piece
24 vent outlet
26 muffler
28 supply line
30 storage reservoir
32 pressure sensor
34a, 34b connection lines
36 electronic control unit
38 control line
40a, 40b control lines
42 sensor line
44a, 44b sensor lines
p pressure
$p_B$ bellows pressure
$p_B/p_V$ normalized bellows pressure, bellows pressure ratio
$p_{B\_1}$ current bellows pressure
$p_{B\_1}/p_{V\_1}$ bellows pressure ratio before air admission or release
$p_B/p_V$ (t) bellows pressure-time characteristic curve
$p_{B\_2}$ target pressure
$p_{B-2}/p_{V-1}$ target pressure ratio
$p_S$ sensed air pressure
$p_V$ supply pressure
$p_{V\_1}$ current supply pressure
t time
$t_1$ time, open
$t_2$ time, close
$\Delta t_o$ opening duration

What is claimed is:

1. A method for controlling an air suspension system of a vehicle, wherein the system has a changeover valve for each air spring of a vehicle axle or of multiple, adjacent tandem axles, and the system further has a shutoff valve for the air spring of each vehicle wheel of the vehicle axle or for each of the air springs on each vehicle side of the multiple, adjacent tandem axles, wherein the respective changeover valve and the shutoff valves are structurally combined in a valve block arranged remote from the air springs, wherein each of the air springs has a spring bellows and, for measuring a bellows pressure in each of the spring bellows of the air springs, the air suspension system has a respective pressure sensor, the sensors being arranged in or on the valve block, wherein each of the pressure sensors is connected at an outlet of the corresponding shutoff valve to a connection line of the spring bellows of the corresponding air spring or of the spring bellows of the associated air springs, and in which the bellows pressure ($p_B$) in the spring bellows of the air springs can be set exactly to a target pressure ($p_{B\_2}$) via measured values of the pressure sensors, wherein the method comprises:

a) determining at least one bellows pressure-time characteristic curve ($p_B/p_V$ (t)) for air admission to and air release from the spring bellows of one of the air springs or of the spring bellows of a plurality of air springs, the characteristic curve being normalized with a value of a supply pressure ($p_V$) in a storage reservoir for compressed air;

b) measuring via a sensor a current bellows pressure ($p_{B\_1}$) in the spring bellows of the air spring or in the spring bellows of the air springs as well as a current supply pressure ($p_{V\_1}$) immediately before air admission thereto or air release therefrom;

c) determining, from the normalized bellows pressure-time characteristic curve ($p_B/p_V$(t)) for air admission or release, an opening duration ($\Delta t_o$) for the corresponding shutoff valve using the ratio of the measured bellows pressure ($p_{B\_1}$) to the measured supply pressure ($p_{V\_1}$) and the ratio of the provided target pressure ($p_{B\_2}$) to the measured supply pressure ($p_{V\_1}$); and, d) opening the corresponding shutoff valve for the determined opening duration ($\Delta t_o$) in order to set a provided target pressure ($p_{B\_2}$).

2. The method of claim 1, wherein the normalized bellows pressure-time characteristic curves ($p_B/p_V$(t)) are each determined using different bellows pressure ratios ($p_{B\_1}/p_{V\_1}$) before air admission or release and using different opening durations ($\Delta t_o$) of the associated shutoff valve with a respective target pressure ratio ($p_{B-2}/p_{V-1}$) as the result.

3. The method of claim 1, wherein the normalized bellows pressure-time characteristic curves ($p_B/p_V$ (t)) are determined at the vehicle manufacturers before final inspection of the respective vehicle and are stored in a data memory of an electronic control unit of the vehicle.

4. The method of claim 1, wherein the normalized bellows pressure-time characteristic curves ($p_B/p_V$ (t)) are checked at specified time or mileage intervals during servicing work at a specialist workshop, and are corrected if required.

5. The method of claim 1, wherein the normalized bellows pressure-time characteristic curves ($p_B/p_V$(t)) are each determined in accordance with a length of the connection line, a diameter of the respective connection line, an existing angle in the run of the connection line, and a volume of the one or more connected spring bellows.

6. The method of claim 5, wherein the bellows pressure-time characteristic curves ($p_B/p_V$ (t)) determined are transferred to combinations of connection lines and spring bellows with the same dimensions.

7. The method of claim 1, wherein separate bellows pressure-time characteristic curves ($p_B/p_V$ (t)) are determined in each case for at least one of certain temperature ranges of the compressed air and different opening combinations of the changeover valves and the shutoff valves.

* * * * *